March 20, 1934.  H. A. SALLOP  1,951,631
AUTOMOBILE SEAT COVER
Filed April 10, 1931  2 Sheets-Sheet 1
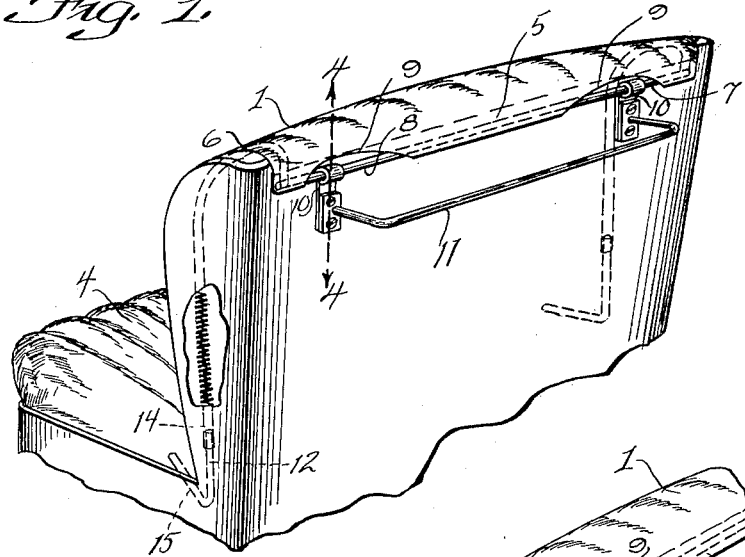
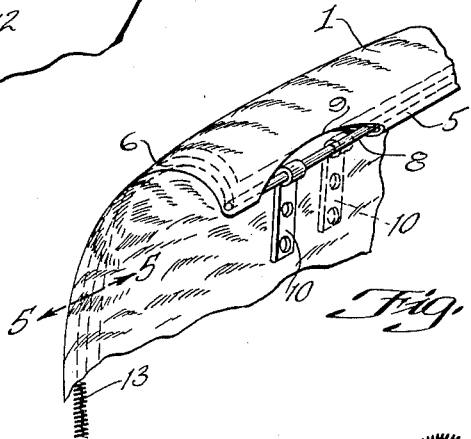
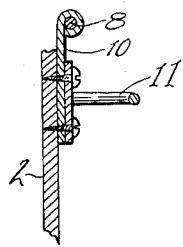
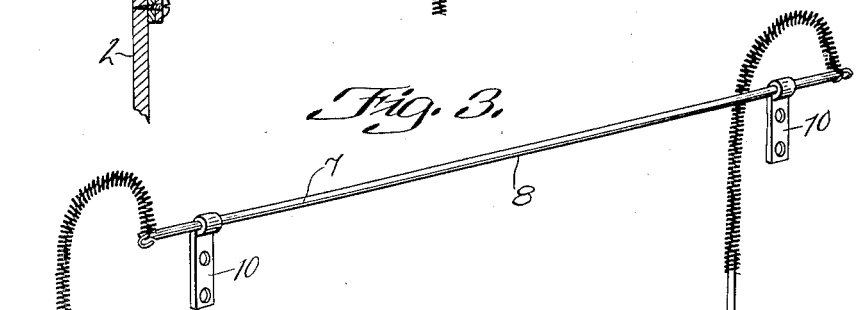
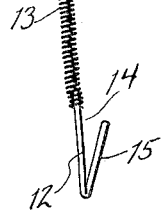
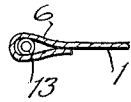
INVENTOR.
Harry A. Sallop
BY
Wm R. Smith
ATTORNEY

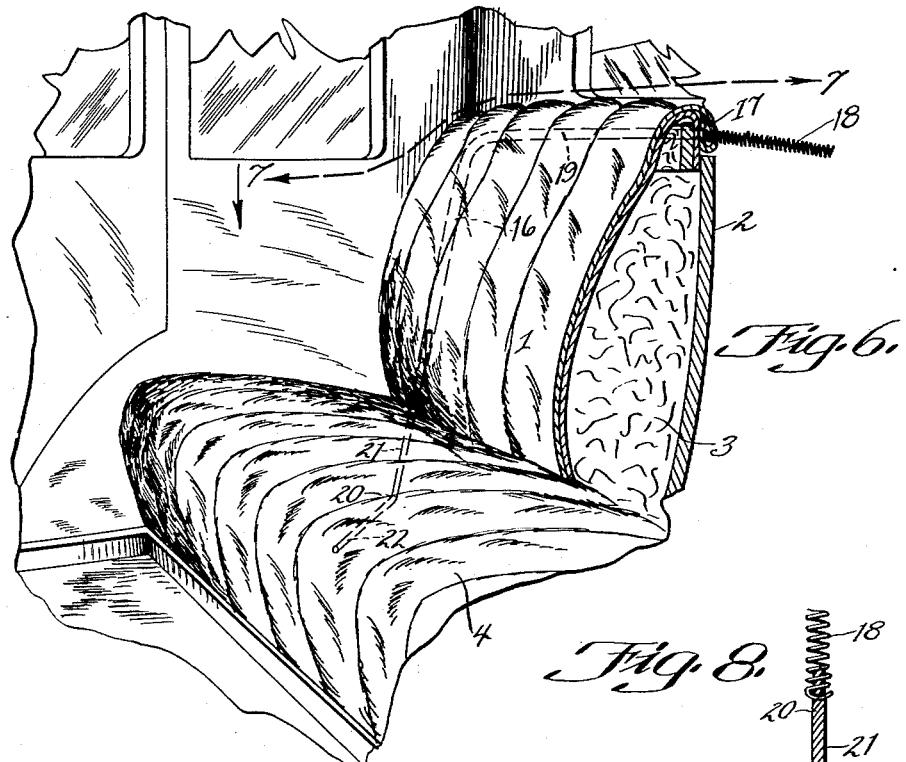
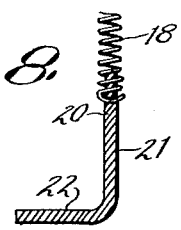
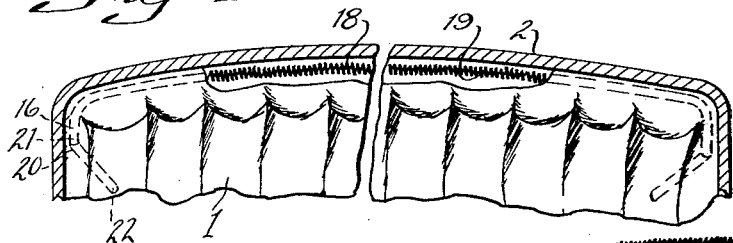
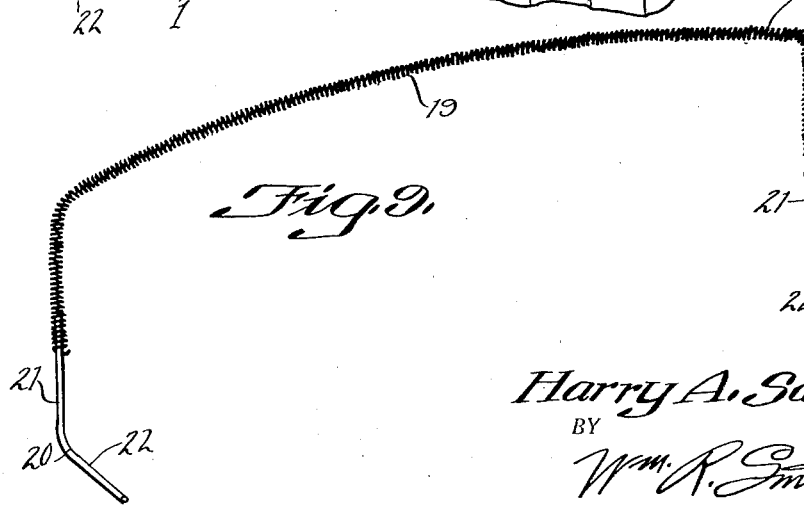

Patented Mar. 20, 1934

1,951,631

UNITED STATES PATENT OFFICE 1,951,631

AUTOMOBILE SEAT COVER

Harry A. Sallop, New York, N. Y.

Application April 10, 1931, Serial No. 529,083

1 Claim. (Cl. 155—182)

This invention relates to an automobile seat cover, and more particularly to a continuation in part of my application for patent filed August 31st, 1929, Serial Number 389,635, which has materialized into Patent No. 1,909,901 and has for its primary object the improvement of certain basic features of the invention set forth in the above mentioned application whereby additional connections can be established between the cover section and the seat structure.

An object of the invention resides in the combination of elements whereby the cover section may be connected with the cushion of the seat structure as well as the back portion of the seat structure through the use of connections interlocking with the cushion and connections secured in fixed positions to the back surface of the seat structure such as by attachment to the back surface or to the usual robe rail carried thereby.

A feature of my invention resides in the yieldable connection of the foot elements with the upper portion of the cover section so that the foot elements may be yieldably adjusted into interlocking engagement with the cushion of the seat structure while at the same time forcing the cover section taut over the seat.

With these and other objects in view the invention will be better understood from the following detailed description taken in connection with the accompanying drawings wherein:

Figure 1 is a perspective view of one form of my invention.

Figure 2 is a perspective view of one corner portion of the cover removed from the seat.

Figure 3 is a perspective view of the frame removed from the cover section.

Figure 4 is a sectional view on the line 4—4, Figure 1.

Figure 5 is a sectional view on the line 5—5, Figure 2.

Figure 6 is a perspective view of another form of my invention.

Figure 7 is a sectional view on the line 7—7, Figure 6.

Figure 8 is a sectional view through one of the side bars.

Figure 9 is a perspective view of that form of frame illustrated in Figure 6.

Again referring to the drawings illustrating two of the many forms of my invention and more particularly that form illustrated in Figures 1 to 5, the numeral 1 designates the cover section, adapted to extend over and completely cover the back 2, of the seat structure 3, that includes a cushion 4. The cover section 1 is provided with a top seam 5 and side seams 6 for reception of my special design of frame 7.

This frame 7 consists of a rod 8 mounted in the seam 5 and having portions exposed through elongated openings 9 in the seam 5 for allowing adjustments of the connectors 10 that are slidably mounted on the rod 8. These connectors 10 are adapted to be secured directly to the back surface of the seat structure or may be directly connected to the robe rail 11, as illustrated.

For the purpose of tucking in and securing the ends of the cover section and establishing a connection between the rod and cushion 4, I have illustrated side bars 12 flexibly connected to the rod 8 in any suitable manner such as by coil springs 13. Each side bar 12 consists of a shank 14 secured to the coil spring and a foot 15 adapted to engage under and interlock with the cushion 4.

In the application of this form of my invention, the connectors, 10 are attached to the back portion of the seat structure which through the rod 8 holds the top portion of the cover section in an extended position over the top edge of the back of the seat. After this has been accomplished the side bars 12 are drawn downward and into interlocking engagement under the cushion 4. Due to the fact that the coil springs 13 are arranged in the side seams 6, it will be appreciated that the end portions of the cover section are drawn into the recesses at the end of the seat structure, thereby drawing the cover section taut over the seat.

In Figures 6 to 9 exclusively, I have illustrated a type of cover particularly adapted for application to the back seat structure of an automobile. This cover also includes a cover section 16 provided with a top seam 17 for reception of the coil spring 18 that forms a component part of the attaching frame 19. This spring 18 as attached to the cover section by the seam 17 extends along the side portions of the seat structure and attaches to side bars 20, each including a shank 21, and foot element 22 for engagement under the seat cushion 4. It is a very simple operation to yieldably force the spring 18 and with it the seam 17 behind the top portion of the seat structure, and after this has been accomplished the side bars 20 are drawn downwards so as to assume interlocking engagement with the seat cushion when the latter is arranged in place.

Of course, it is to be understood that coil springs may be attached to the back section in various other manners than illustrated and the component parts of the frame may be changed and associated in other relations without departing from the spirit of my invention.

Therefore, I do not desire to be limited in protection in any manner whatsoever, except as set forth in the following claim:

What I claim is:

An automobile seat cover comprising a cover section, a substantially straight rod secured to and extending the length of the cover section, connectors for securing said rod to the back portion of a seat structure, L shaped foot elements adapted to have one end portion engage under the cushion of a seat structure and its other end portion extending vertically and a coil spring for each foot element extending over the back having one end fixed to one end of said rod and its other end fixed to the vertical end portion of said foot element and being secured to the adjacent edge of the cover.

HARRY A. SALLOP.